United States Patent
Tsai

(10) Patent No.: US 9,975,604 B2
(45) Date of Patent: May 22, 2018

(54) DUAL CONTROL LEVER AND BICYCLE STEM HAVING THE SAME

(71) Applicant: TEKTRO TECHNOLOGY CORPORATION, Changhua County (TW)

(72) Inventor: Szu-Fang Tsai, Taichung (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 364 days.

(21) Appl. No.: 14/853,595

(22) Filed: Sep. 14, 2015

(65) Prior Publication Data
US 2016/0272281 A1    Sep. 22, 2016

Related U.S. Application Data

(60) Provisional application No. 62/134,751, filed on Mar. 18, 2015.

(51) Int. Cl.
| | |
|---|---|
| *B62M 25/08* | (2006.01) |
| *B62K 23/06* | (2006.01) |
| *B62L 3/02* | (2006.01) |

(52) U.S. Cl.
CPC ............ *B62M 25/08* (2013.01); *B62K 23/06* (2013.01); *B62L 3/02* (2013.01)

(58) Field of Classification Search
CPC .............................. B62M 25/08; B62K 23/06
See application file for complete search history.

(56) References Cited

U.S. PATENT DOCUMENTS

| | | | | |
|---|---|---|---|---|
| 6,015,036 A * | 1/2000 | Fukuda | ................ | B62K 23/06 192/217 |
| 6,418,368 B2 * | 7/2002 | Jinbo | .................... | B62K 23/06 188/24.11 |
| 8,272,292 B2 * | 9/2012 | De Perini | ............. | B62K 23/02 74/502.2 |
| 8,550,942 B2 * | 10/2013 | Oda | ....................... | B62K 23/06 474/80 |
| 2001/0053724 A1 * | 12/2001 | Campagnolo | .......... | B62M 25/08 474/80 |
| 2015/0259025 A1 * | 9/2015 | Sala | ....................... | B62K 23/06 74/473.12 |
| 2016/0152299 A1 * | 6/2016 | Mu | .......................... | B62L 3/02 74/471 R |
| 2016/0272282 A1 * | 9/2016 | Tsai | ....................... | B62M 25/08 |
| 2016/0311499 A1 * | 10/2016 | Kasai | ..................... | B62M 25/08 |
| 2016/0339986 A1 * | 11/2016 | Jordan | .................. | B62K 23/02 |

* cited by examiner

*Primary Examiner* — Terence Boes
(74) *Attorney, Agent, or Firm* — Maschoff Brennan

(57) ABSTRACT

A dual control lever includes a fixed base, a brake lever, a pivot lever, a first electrical button, a second electrical button and a third electrical button. The brake lever is pivoted on the fixed base. The pivot lever is rotatably close to the brake lever. The first electrical button is disposed on the pivot lever. The second electrical button disposed on the pivot lever. The third electrical button is disposed on the pivot lever.

17 Claims, 6 Drawing Sheets

DUAL CONTROL LEVER AND BICYCLE STEM HAVING THE SAME

CROSS-REFERENCE TO RELATED APPLICATIONS

This non-provisional application claims priority under 35 U.S.C. § 119(e) on Provisional Application No(s). 62/134,751 filed on Mar. 18, 2015, the entire contents of which are hereby incorporated by reference.

BACKGROUND

Technical Field

The disclosure relates to a dual control lever and a bicycle stem having the same. More particularly, the disclosure relates to an electrical dual control lever and an electrical bicycle stem having the same.

Background

In recent years, bicycles are popular for users to ride in bicycle races or their daily lives. Generally speaking, bicycles are usually equipped with a derailleur for shifting a chain to different cassettes (i.e., sprockets) according to different topographic features or requirements. The derailleurs can be classified into a mechanical derailleur and an electrical derailleur. The mechanical derailleur is for shifting the speed steps of a front derailleur and a rear derailleur by a shift lever and a transmission cable. The electrical derailleur is for shifting the speed steps of the front derailleur and the rear derailleur by an electrical button and a control circuit.

SUMMARY

One aspect of the disclosure provides a dual control lever, which includes a fixed base, a brake lever, a pivot lever, a first electrical button, a second electrical button and a third electrical button. The brake lever is pivoted on the fixed base. The pivot lever is rotatably close to the brake lever. The first electrical button is disposed on the pivot lever. The second electrical button disposed on the pivot lever. The third electrical button is disposed on the pivot lever.

Another aspect of the disclosure provides a bicycle stem, which includes a handlebar and the two dual control levers. The handlebar includes a central part, a right gripping part and a left gripping part. The central part has two sides which are opposite to each other and connected to the right gripping part and the left gripping part, respectively. The two fixed bases of the dual control levers are disposed on the right gripping part and the left gripping part, respectively.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Figure 1:
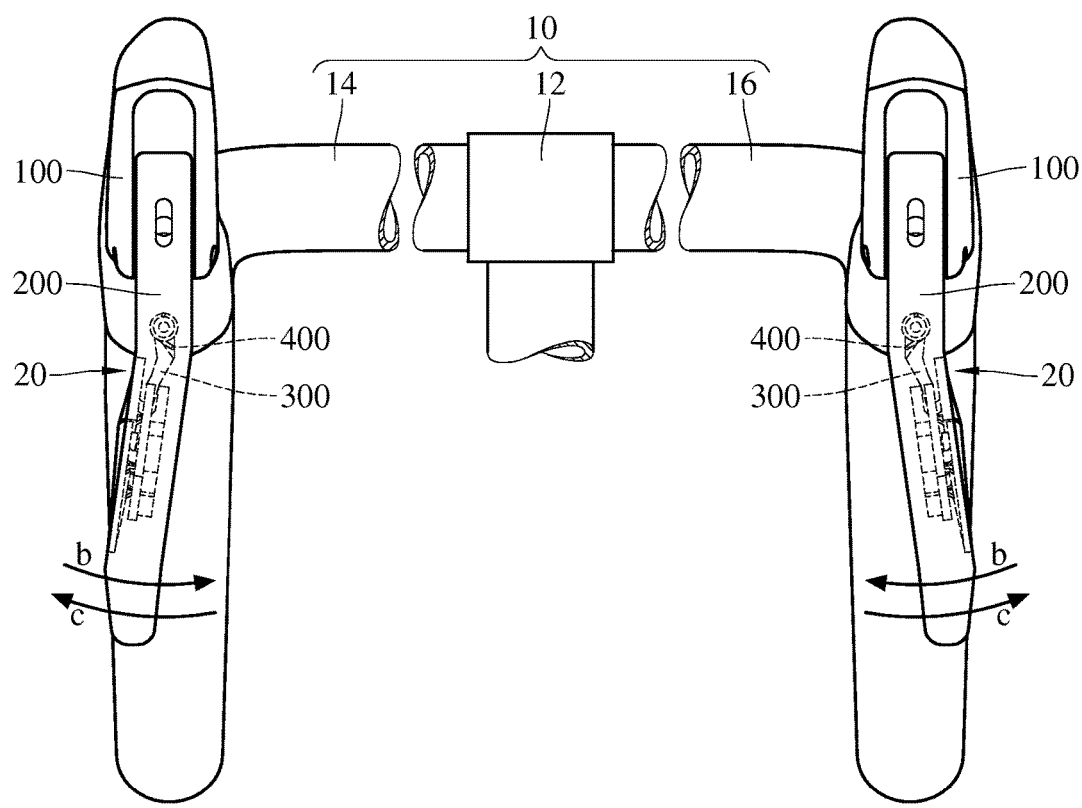
FIG. 1 is a front view of a bicycle stem according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1 which is a front view of a bicycle stem according to a first embodiment of the disclosure. In this embodiment, the bicycle stem 1 includes a handlebar 10 and two dual control levers 20. The handlebar 10 includes a central part 12, a right gripping part 14 and a left gripping part 16. The central part 12 has two sides which are opposite to each other. The two sides of the central part 12 are connected to the right gripping part 14 and the left gripping part 16, respectively. The two dual control levers 20 are disposed on the right gripping part 14 and the left gripping part 16, respectively.

Figure 2:
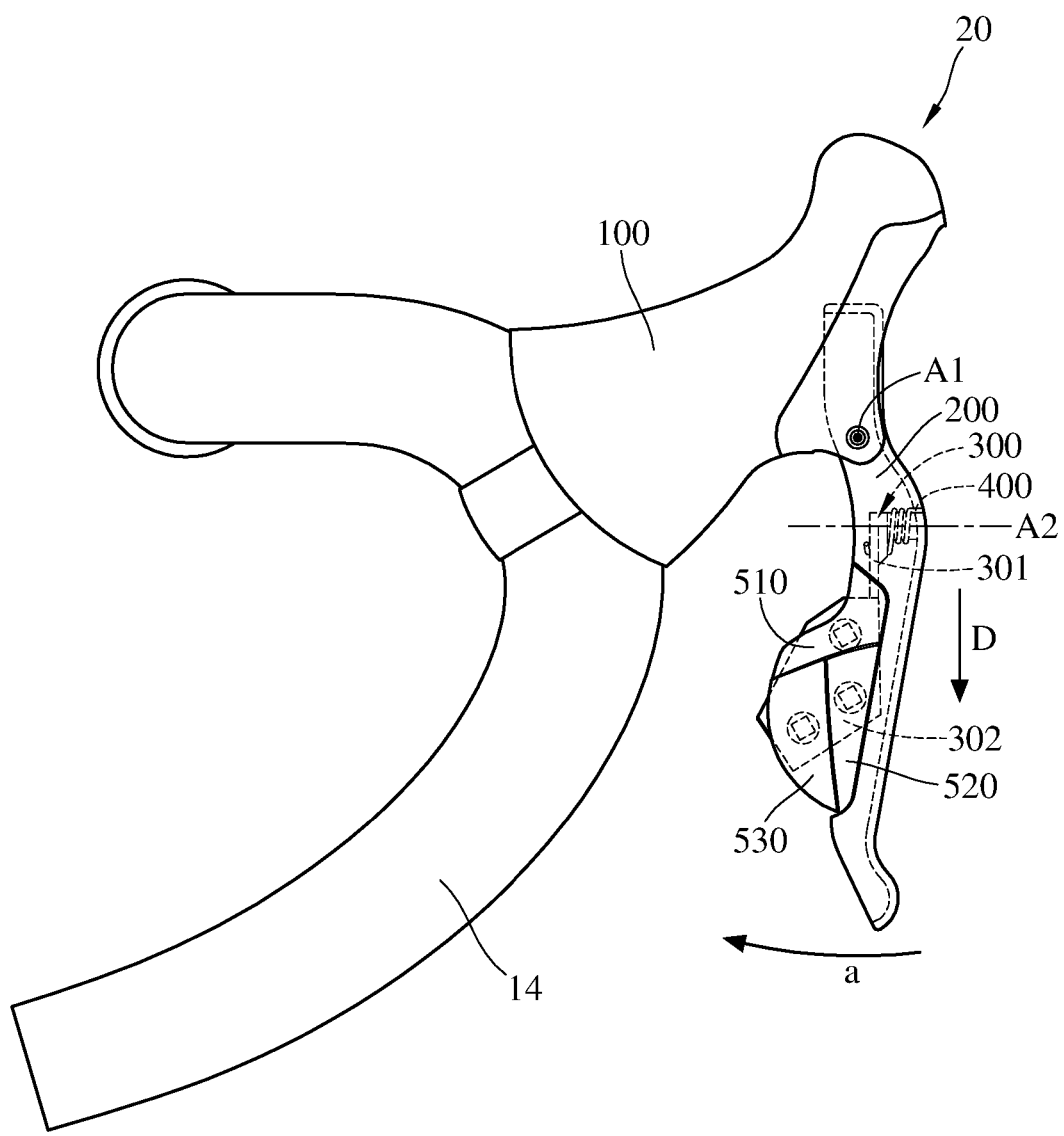
FIG. 2 is a side view of the bicycle stem in FIG. 1.
Figure 3:
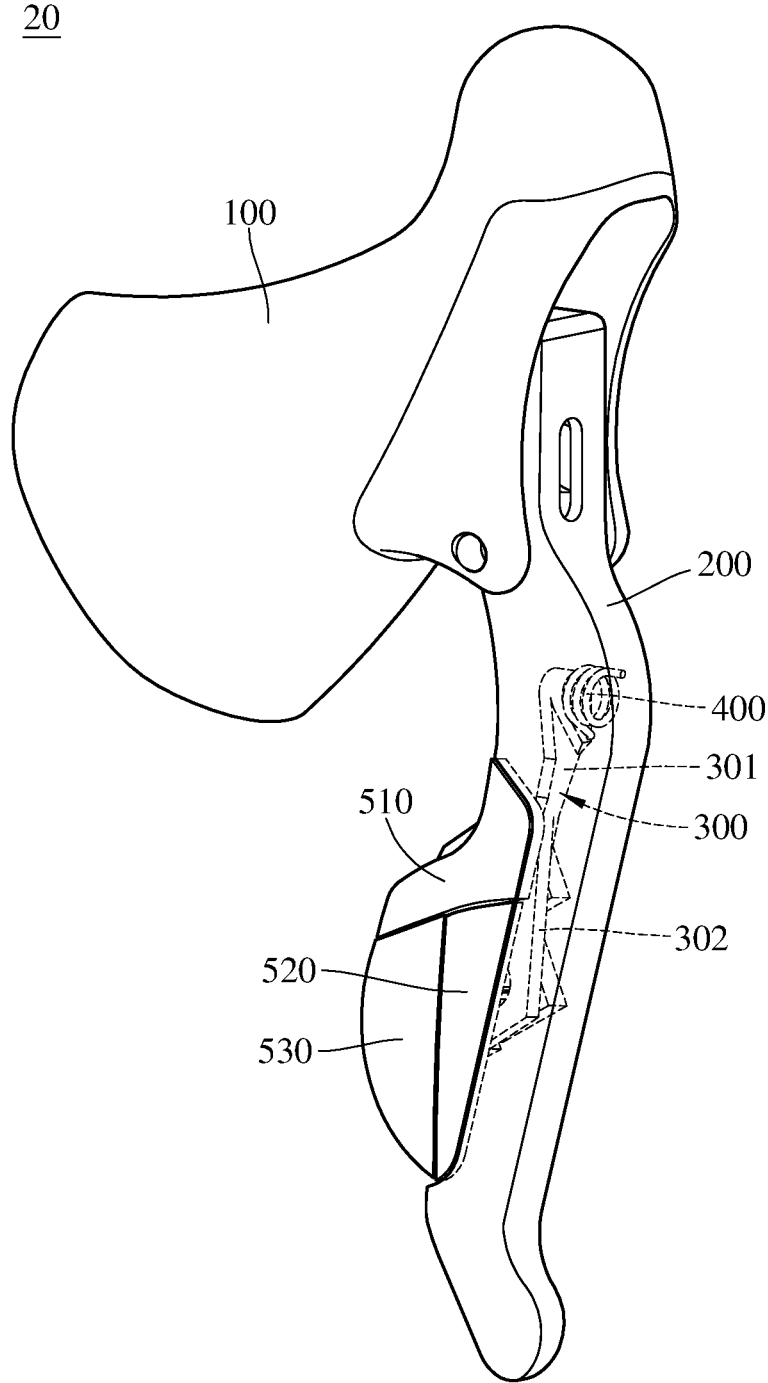
FIG. 3 and FIG. 4 are perspective views of a dual control lever in FIG. 2.
Figure 4:
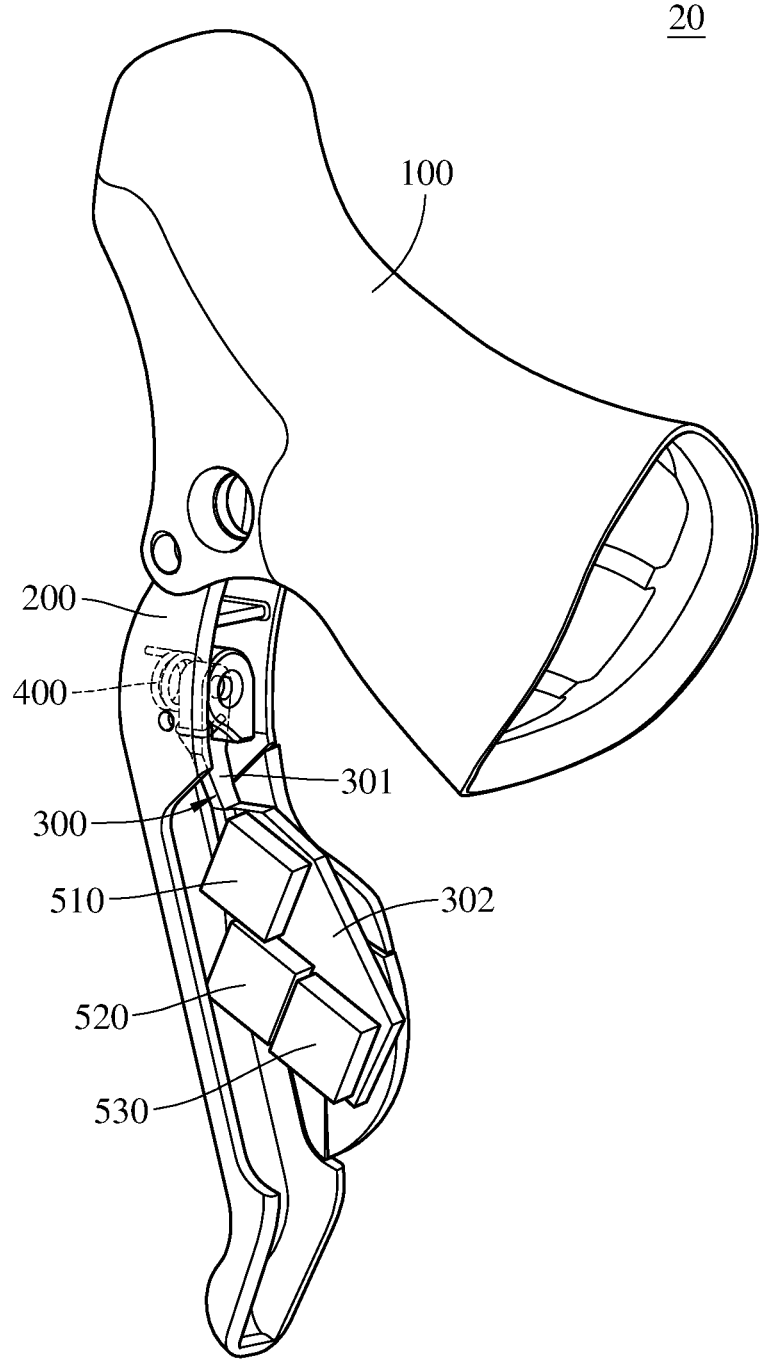

Specifically, please refer to FIG. 1 through FIG. 4. FIG. 2 is a side view of the bicycle stem in FIG. 1. FIG. 3 and FIG. 4 are perspective views of a dual control lever in FIG. 2. Each dual control lever 20 includes a fixed base 100, a brake lever 200, a pivot lever 300, a restoration component 400, a first electrical button 510, a second electrical button 520 and a third electrical button 530.

The two fixed base 100 of the two dual control levers 20 are disposed on the right gripping part 14 and the left gripping part 16 respectively, for being held by a right hand or a left hand of a user.

The brake lever 200 is pivoted on the fixed base 100 and extends along a radial direction (indicated by an arrow a) of the fixed base 100, for driving brake components (not shown in figures) correspondingly to stop or brake rotations of wheels of the bicycle.

The pivot lever 300 is pivoted on the brake lever 200. The pivot lever 300 includes a fixed-end part 301 and a free-end part 302 that are connected to each other. The fixed-end part 301 is pivoted on the brake lever 200, and the free-end part 302 is connected to the brake lever 200 through the fixed-end part 301. Pressed by an external force, the pivot lever 300 is driven to rotate relative to the brake lever 200 (indicated by an arrow b) about an axis A2 of rotation as a central line of rotation. The axis A2 of rotation of the pivot lever 300 is substantially orthogonal to an axis A1. The pivot lever 300 is, but not limited to, pivoted on the brake lever 200. In other embodiments, for example, the pivot lever 300 is pivoted on the fixed base 100 and close to the brake lever 200.

The restoration component 400, for example, is a torque spring. The restoration component 400 has two ends which are opposite to each other, and surrounds a pivot which connects the brake lever 200 and the fixed-end part 301 of the pivot lever 300. One of the two ends of the restoration component 400 is connected to the brake lever 200, and the other end of the restoration component 400 is connected to the fixed-end part 301 of the pivot lever 300, for driving the pivot lever 300 to rotate outward (indicated by an arrow c in FIG. 1) to stay in a normal status. The normal status means an initial status of the restoration component 400 when the restoration component 400 is only pressed by the brake lever 200 and the fixed-end part 301 of the pivot lever 300 without receiving other external forces.

Figure 5:
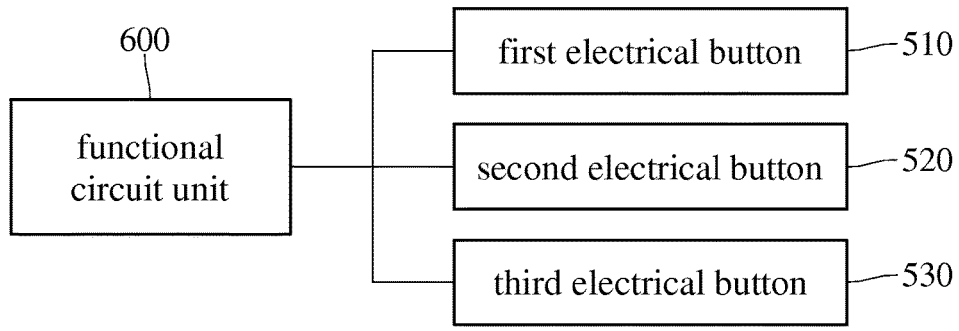
FIG. 5 is a block diagram of a functional circuit unit electrically connected to a first electrical button, a second electrical button and a third electrical button in FIG. 2.

The first electrical button 510, the second electrical button 520 and the third electrical button 530 are all disposed on the free-end part 302 of the pivot lever 300 which is rotatably with respect to the brake lever 200 so that first electrical button 510, the second electrical button 520 and the third electrical button 530 are movable with respect to the brake lever 200. In addition, as shown in FIG. 2, the first electrical button 510, the second electrical button 520 and the third electrical button 530 each have a press surface for user to operate the buttons, and their press surfaces all face the same direction. Furthermore, the second electrical button 520 and the third electrical button 530 are located on the same side of the first electrical button 510, and the second electrical button 520 is located between the third electrical button 530 and the brake lever 200. Additionally, please refer to FIG. 2 through FIG. 5. FIG. 5 is a block diagram of a functional circuit unit electrically connected to a first electrical button, a second electrical button and a third electrical button in FIG. 2. The dual control lever 20 further includes a functional circuit unit 600. The functional circuit unit 600 is, but not limited to, disposed on the brake lever 200. Furthermore, the functional circuit unit 600 is electrically connected to the first electrical button 510, the second electrical button 520 and the third electrical button 530. The functions of the first electrical button 510, the second electrical button 520 and the third electrical button 530 are changeable according to the requirements of the user, such as the functions of shifting an half speed step, shifting up one speed step, shifting down one speed step and switching left and right.

For example, in this embodiment, the first electrical button 510 is for triggering the functional circuit unit 600 to generate a first control signal for shifting an half speed step in response. When the user press the first electrical button 510 by his/her index finger, the first electrical button 510 is for triggering the functional circuit unit 600 to generate the first control signal for shifting an half speed step of a front derailleur in response.

When a chain is meshed with a smaller chain ring (not shown in figures) and a smaller cassette (not shown in figures), or when the chain is meshed with a larger chain ring (not shown in figures) and a larger cassette (not shown in figures), the chain is tilted and may be interfered with the front derailleur, the rear derailleur or gears (not shown in figures). The purpose of shifting an half speed step is to make the chain close to the larger chain ring, for decreasing the chance of interference between each component.

The second electrical button 520 is for driving the functional circuit unit 600 to generate a second control signal for shifting up one speed step, and the third electrical button 530 is for driving the functional circuit unit 600 to generate a third control signal for shifting down one speed step. When the user press the second electrical button 520 by his/her middle finger, the second electrical button 520 is for triggering the functional circuit unit 600 to generate the second control signal for shifting up one speed step in response. Moreover, when the user press the third electrical button 530 by his/her ring finger, the third electrical button 530 is for triggering the functional circuit unit 600 to generate a third control signal for shifting down one speed step of the front derailleur or a rear derailleur in response. When riding on a flat or smooth road, the user can adjust the speed of the bicycle slightly by the function of shifting down one speed step since the slopes of the road change slightly.

The first electrical button 510 accompanied by the second electrical button 520 is for driving the functional circuit unit 600 to generate a fourth control signal for shifting up multiple speed steps, and the first electrical button 510 accompanied by and the third electrical button 530 is for triggering the functional circuit unit 600 to generate a fifth control signal for shifting down multiple speed steps in response. Specifically, when the user press the first electrical button 510 and the second electrical button 520 by his/her index finger and middle finger at the same time, the first electrical button 510 and the second electrical button 520 are for triggering the functional circuit unit 600 to generate the fourth control signal for shifting up multiple speed steps of the front derailleur or the rear derailleur in response. Moreover, when the user press the first electrical button 510 and the third electrical button 530 by his/her index finger and middle finger at the same time, the third electrical button 530 and the first electrical button 510 are for triggering he functional circuit unit 600 to generate the fifth control signal for shifting down multiple speed steps of the front derailleur or the rear derailleur in response. When riding on a tilt road (e.g., mountain road), the user can adjust the speed of the bicycle rapidly by the function of shifting down multiple speed steps since the slopes of the road may change significantly.

The two first electrical buttons 510 disposed oppositely are for switching the functions of the two dual control levers 20 at the left and right sides of the bicycle. Namely, when the user presses the first electrical button 510 disposed on the right gripping part 14 and the first electrical button 510 disposed on the left gripping part 16 by his/her index fingers at the same time, the two first electrical buttons 510 are for triggering the functional circuit unit 600 to generate a function-switch signal in response.

The operations of the derailleurs are different in different countries. For example, the dual control lever 20 at the right side is for controlling the rear derailleur, and the dual control lever 20 at the left side is for controlling the front derailleur in American countries. On the contrary, the dual control lever 20 at right side is for controlling the front derailleur, and the dual control lever 20 at left side is for controlling the rear derailleur in British countries. Accordingly, this switching functions between the left and right sides of the derailleur can satisfy different using habits in different countries.

As above-mentioned, since all the first electrical button 510, the second electrical button 520 and the third electrical button 530 are disposed on the pivot lever 300, the user may press the pivot lever 300 while pressing the first electrical button 510, the second electrical button 520 or the third electrical button 530, which is similar to the operation of a mechanical derailleur. That is to say, the pivoting of the pivot lever 300 generated by the user makes it like the operation of the mechanical derailleur.

Figure 6:
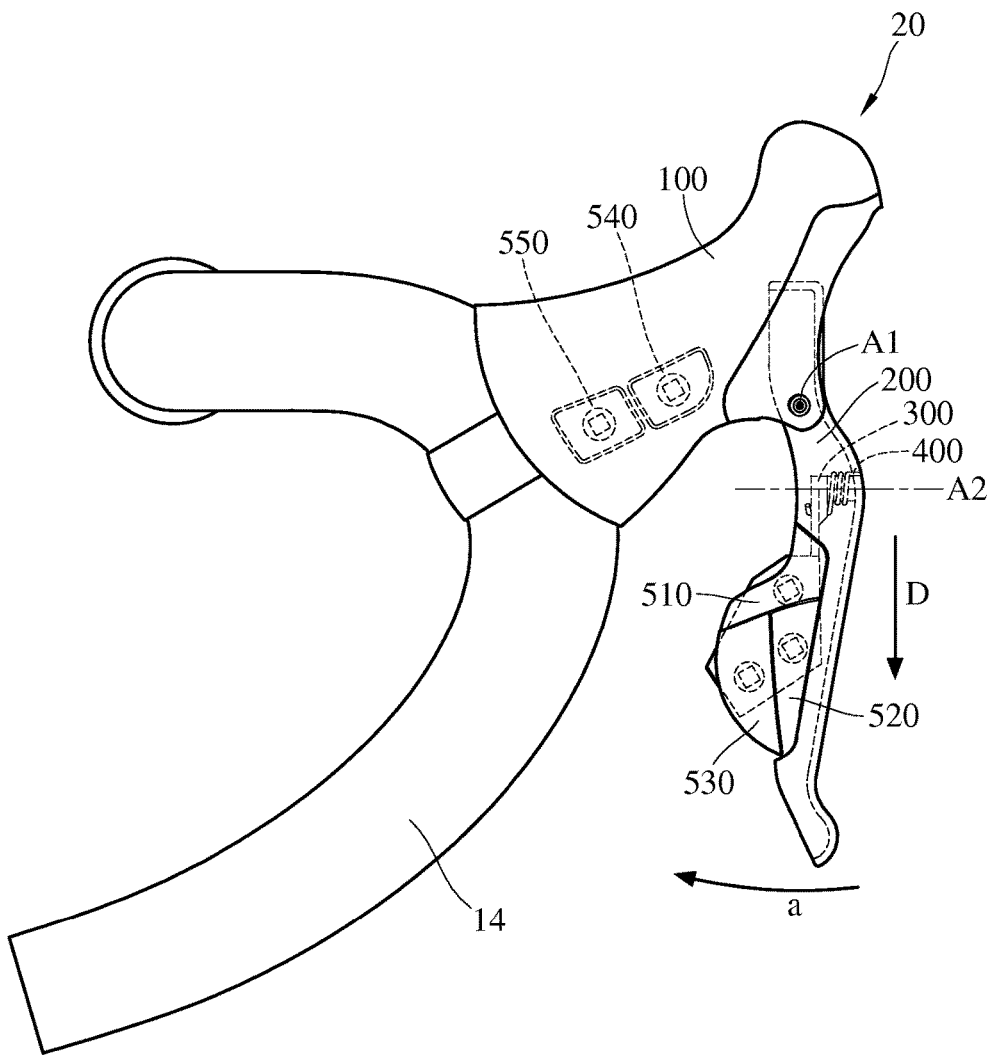
FIG. 6 is a side view of a bicycle stem according to a second embodiment of the disclosure.
Figure 7:
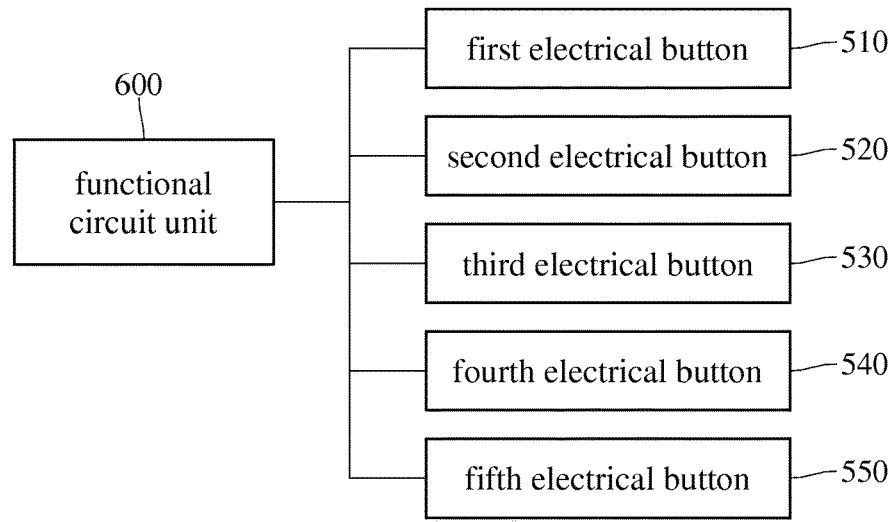
FIG. 7 is a block diagram of a functional circuit unit electrically connected to a first electrical button, a second electrical button, a third electrical button, a fourth electrical button and a fifth electrical button in FIG. 6.

Please refer to FIG. 6 and FIG. 7. FIG. 6 is a side view of a bicycle stem according to a second embodiment of the disclosure. FIG. 7 is a block diagram of a functional circuit unit electrically connected to a first electrical button, a second electrical button, a third electrical button, a fourth electrical button and a fifth electrical button in FIG. 6. This embodiment is similar to the first embodiment, such that only the differences between this embodiment and the first embodiment will be described as follows.

In this embodiment, the dual control lever 20 further includes a fourth electrical button 540 and a fifth electrical button 550. Both the fourth electrical button 540 and the fifth electrical button 550 are disposed at an inner side of the fixed base 100, for being pressed by the thumb of the user. Moreover, both the fourth electrical button 540 and the fifth electrical button 550 are electrically connected to the functional circuit unit 600, and their functions can be altered according to the requirements of the user. Thus, the functions of shifting an half speed step, shifting up one speed step, shifting down one speed step and switching the functions between the two dual control levers 20.

For example, in this embodiment, the fourth electrical button 540 is for driving the functional circuit unit 600 to generate the first control signal for shifting an half speed step. When the user press the fourth electrical button 540 by his/her thumb, the fourth electrical button 540 is for triggering the functional circuit unit 600 to generate the first control signal for shifting an half speed step of the front derailleur in response.

The fifth electrical button 550 is, but not limited to, for triggering the functional circuit unit 600 to generate the second control signal for shifting up one speed step in response. In other embodiments, for example, the fifth electrical button 550 is for triggering the functional circuit unit 600 to generate the third control signal for shifting down one speed step in response. In this embodiment, when the user press the fifth electrical button 550 by his/her thumb, the fifth electrical button 550 is for triggering the functional circuit unit 600 to generate the second control signal for shifting up one speed step of the front derailleur or the rear derailleur in response.

The fourth electrical button 540 accompanied by the fifth electrical button 550 is, but not limited to, for triggering the functional circuit unit 600 to generate the fourth control signal for shifting up multiple speed steps in response. In other embodiments, for example, the fourth electrical button 540 accompanied by the fifth electrical button 550 is for triggering the functional circuit unit 600 to generate the fifth control signal for shifting down multiple speed steps in response. In this embodiment, when the user press the fourth electrical button 540 and the fifth electrical button 550 by his/her thumbs at the same time, the fourth electrical button 540 and the fifth electrical button 550 are for triggering the functional circuit unit 600 to generate the fourth control signal for shifting up multiple speed steps of the front derailleur or the rear derailleur in response.

In this embodiment, the functions of the fourth electrical button 540 and the fifth electrical button 550 is similar to those of the first electrical button 510 and the second electrical button 520. However, the fourth electrical button 540 and the fifth electrical button 550 are for providing the user another operating method. Hence, the user can operate the first electrical button 510, the second electrical button 520, the third electrical button 530, the fourth electrical button 540 and the fifth electrical button 550 according to his/her using habit. For example, the user can press the first electrical button 510, the second electrical button 520, the third electrical button 530, the fourth electrical button 540 and the fifth electrical button 550 by his/her index finger, middle finger or thumb.

Figure 8:
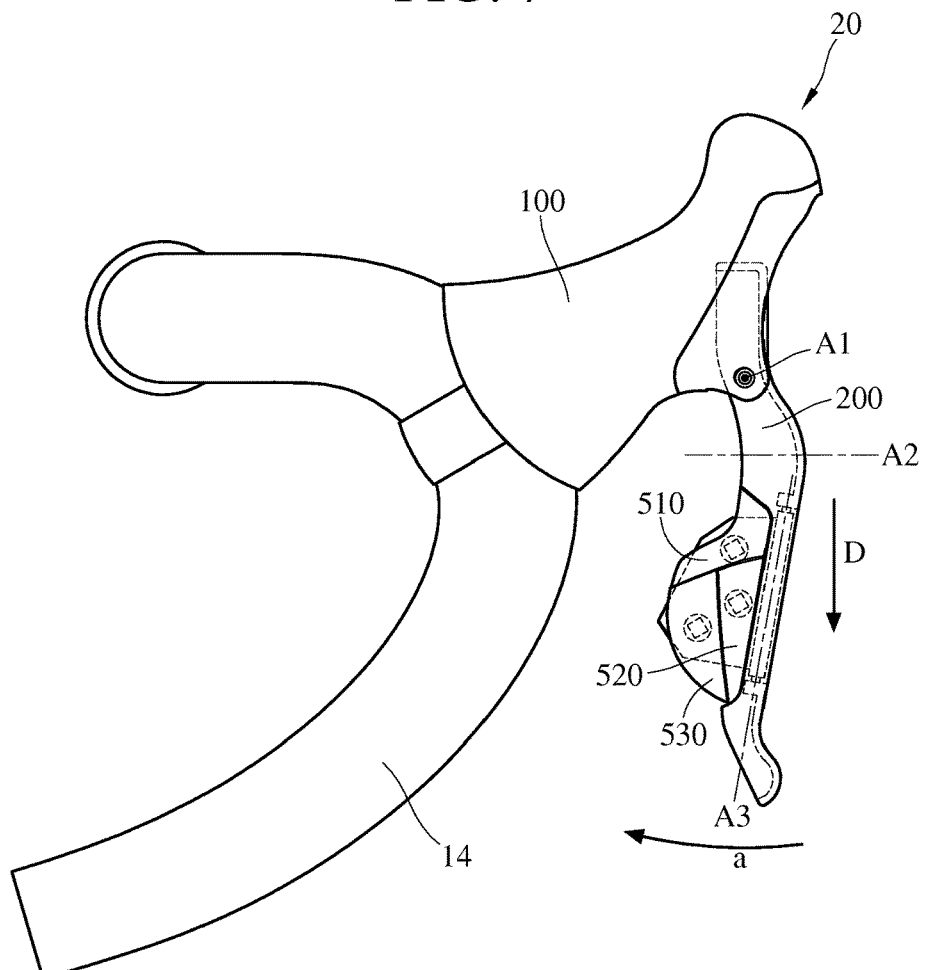
FIG. 8 is a side view of a bicycle stem according to a third embodiment of the disclosure.

The axis of rotation of the pivot lever 300 is, but not limited to, substantially orthogonal to the axis of rotation and the extension direction of the brake lever 200. Please refer to the FIG. 8 which is a side view of a bicycle stem according to a third embodiment of the disclosure. In this embodiment, an axis of rotation of the pivot lever 300 is substantially orthogonal to an axis of rotation of the brake lever 200 and parallel to the extension direction of the brake lever 200. Similar to the first embodiment, the user may press the pivot lever 300 while pressing the first electrical button 510, the second electrical button 520 or the third electrical button 530 in this embodiment.

To sum up, the bicycle stem and the dual control lever according to this disclosure has the functions of shifting an half speed step, shifting up one speed step, shifting down one speed step due to the combination of the first electrical button, the second electrical button, and the third electrical button. Hence, the user can adjust the speed of the bicycle slightly or significantly according to the different topographic features of the roads.

Additionally, when the user presses the two first electrical buttons, the functional circuit units of the two dual control levers are driven to generate a function-switch signal for switching the functions of the left and right sides of the two dual control levers. Accordingly, this disclosure can satisfy the settings in different countries.

Furthermore, since the first electrical button, the second electrical button and the third electrical button are disposed on the pivot lever, the user may press the pivot lever while pressing the first electrical button, the second electrical button or the third electrical button. The pivoting of the pivot lever makes the operation of the dual control lever like the operation of s mechanical derailleur.

Moreover, the fourth electrical button and the fifth electrical button are disposed at an inner side of the fixed base, for providing another operating method for users.

The disclosure will become more fully understood from the said embodiment for illustration only and thus does not limit the disclosure. Any modifications within the spirit and category of the disclosure fall in the scope of the disclosure.

What is claimed is:

1. A dual control lever, comprising:
   a fixed base;
   a brake lever pivoted on the fixed base;
   a pivot lever rotatable with respect to the brake lever;
   a first electrical button disposed on the pivot lever;
   a second electrical button disposed on the pivot lever; and
   a third electrical button disposed on the pivot lever;
   wherein the pivot lever comprises a fixed-end part and a free-end part which are connected to each other, the fixed-end part is pivoted on the brake lever, the free-end part is connected to the brake lever through the fixed-end part, and the first electrical button, the second electrical button and the third electrical button are disposed on the free-end part of the pivot lever so that the first electrical button, the second electrical button and the third electrical button are movable with respect to the brake lever.

2. The dual control lever according to claim 1, wherein the pivot lever is pivoted on the brake lever.

3. The dual control lever according to claim 1, wherein an axis of rotation of the pivot lever is orthogonal to an axis of rotation of the brake lever.

4. The dual control lever according to claim 3, wherein the axis of rotation of the pivot lever is substantially parallel to an extension direction of the brake lever.

5. The dual control lever according to claim 3, wherein the axis of rotation of the brake lever is substantially orthogonal to an extension direction of the brake lever.

6. The dual control lever according to claim 1, further comprising a restoration component with two ends which are opposite to each other, one of the ends of the restoration component is connected to the brake lever, and the other end of the restoration component is connected to the pivot lever.

7. The dual control lever according to claim 1, further comprising a functional circuit unit electrically connected to the first electrical button, the second electrical button and the third electrical button.

8. The dual control lever according to claim 7, wherein when the first electrical button is triggered, the functional circuit unit is for generating a first control signal for shifting an half speed step in response, when the second electrical button is triggered, the functional circuit unit is for generating a second control signal for shifting up one speed step in response, and when the third electrical button is triggered, the functional circuit unit is for generating a third control signal for shifting down one speed step in response.

9. The dual control lever according to claim 7, wherein when both the first electrical button and the second electrical button are triggered, the functional circuit unit is for generating a first control signal for shifting up multiple speed steps in response, and when both the third electrical button and the first electrical button are triggered, the functional circuit unit is for generating a second control signal for shifting down multiple speed steps in response.

10. The dual control lever according to claim 7, further comprising a fourth electrical button and a fifth electrical button both of which are disposed on the fixed base and electrically connected to the functional circuit unit.

11. The dual control lever according to claim 10, wherein when the fourth electrical button is triggered, the functional circuit unit is for generating a first control signal for shifting an half speed step in response, and when the fifth electrical button is triggered, the functional circuit unit is for generating a second control signal for shifting up one speed step in response.

12. A bicycle stem, comprising:
a handlebar comprising a central part, a right gripping part and a left gripping part, the central part having two sides which are opposite to each other and connected to the right gripping part and the left gripping part respectively; and
two dual control levers according to claim 1, the fixed bases of the dual control levers are disposed on the right gripping part and the left gripping part, respectively.

13. The bicycle stem according to claim 12, further comprising a functional circuit unit electrically connected to the first electrical button, the second electrical button and the third electrical button.

14. The bicycle stem according to claim 13, wherein when the first electrical button is triggered, the functional circuit unit is for generating a first control signal for shifting an half speed step in response, when the second electrical button is triggered, the functional circuit unit is for generating a second control signal for shifting up one speed step in response, and when the third electrical button is triggered, the functional circuit unit is for generating a third control signal for shifting down one speed step in response.

15. The bicycle stem according to claim 13, wherein when both the first electrical button disposed on the right gripping part and the first electrical button disposed on the left gripping part are triggered, the functional circuit unit is for generating a function-switch signal of left and right in response.

16. The bicycle stem according to claim 1, wherein the first electrical button, the second electrical button and the third electrical button each have a press surface facing the same direction.

17. The bicycle stem according to claim 1, wherein the second electrical button and the third electrical button are located at the same side of the first electrical button, and the second electrical button is located between the third electrical button and the brake lever.

* * * * *